United States Patent [19]

Jones

[11] 4,180,136

[45] Dec. 25, 1979

[54] WEIGHT ACTUATED FEED DROP APPARATUS

[75] Inventor: Robert D. Jones, Oskaloosa, Iowa.

[73] Assignee: Intraco, Inc, Oskaloosa, Iowa

[21] Appl. No.: 942,675

[22] Filed: Sep. 15, 1978

[51] Int. Cl.² ............... G01G 13/02; G01G 13/18; A01K 1/10

[52] U.S. Cl. ............... 177/68; 177/78; 177/105; 119/57

[58] Field of Search ............... 177/60, 68, 78, 105, 177/116, 216; 119/56 R, 57

[56] References Cited

U.S. PATENT DOCUMENTS

| | | | |
|---|---|---|---|
| 2,681,639 | 6/1954 | Littlefield | 119/57 |
| 3,254,729 | 6/1966 | Behlen | 177/116 X |
| 3,869,006 | 3/1975 | Hostetler | 177/60 |

*Primary Examiner*—George H. Miller, Jr
*Attorney, Agent, or Firm*—Henderson & Sturm

[57] ABSTRACT

A weight actuated dispensing mechanism including a bracket adapted to be attached to a conveyor system and having an inlet opening therein for receiving material from the conveyor system, and an outlet opening for allowing the material to exit from the bracket by gravity. A valving mechanism is pivotally attached along an axis to the bracket for movement between a first position wherein the valve mechanism closes the outlet opening of the bracket and a second position wherein the valve mechanism is open to allow material to pass from the conveyor system, through the bracket, to a container disposed below the bracket. A projection on the valve mechanism is provided for automatically increasing the closing force on the valve mechanism as it closes. One end of a flexible line is attached to the valve mechanism and extends over the projection. The other end of the line is attached to the container for holding the container, whereby a predetermined amount of material by weight is automatically dispensed into the container, upon which event the valve mechanism automatically closes to insure that no more than the desired weight of material is dispensed.

11 Claims, 11 Drawing Figures

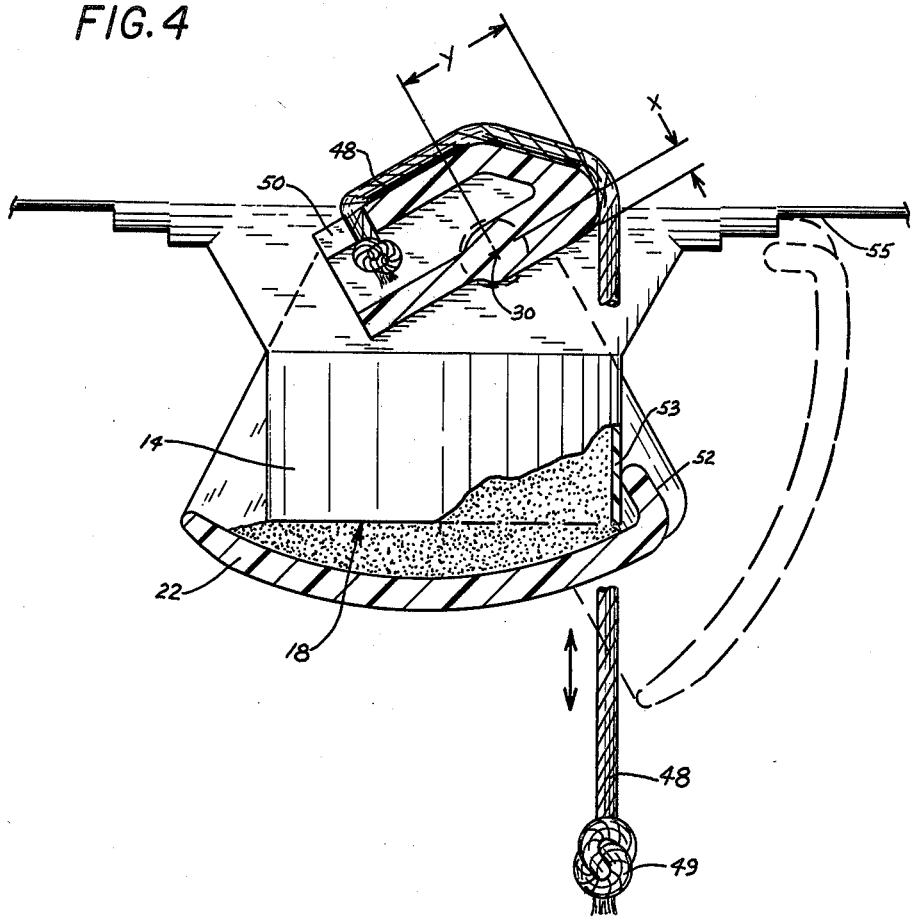

WEIGHT ACTUATED FEED DROP APPARATUS

BACKGROUND OF THE INVENTION

The present invention relates generally to a mechanism for dispensing a certain amount of material into a container from a conveyor system, and more particularly to such a mechanism which is actuated by the weight of the material being dispensed.

In the feeding of poultry and livestock which are kept in numerous pens certain structures such as that shown in U.S. Pat. No. 4,031,857 to Robert D. Jones have been used to measure out a certain volume of feed and then provide for it being dropped out of such structure to automatically provide a measured amount of feed to such birds or animals. In certain instances it has been desired to measure and dispense by weight instead of by volume, and certain structures have been devised to accomplish this function. The problems with such prior art structures have been in the areas of dependability and expense of construction to complex structures.

Consequently there is a need for a weight operated structure of the type described above which does not have the aforementioned disadvantages.

SUMMARY OF THE INVENTION

The present invention relates to a weight actuated dispensing mechanism including a bracket adapted to be attached to a conveyor system and having an inlet opening therein for receiving material from the conveyor system, and an outlet opening for allowing the material to exit from the bracket by gravity. A valving mechanism is pivotally attached along an axis to the bracket for movement between a first position wherein the valve mechanism closes the outlet opening of the bracket and a second position wherein the valve mechanism is open to allow material to pass from the conveyor system, through the bracket, to a container disposed below the bracket. A projection on the valve mechanism is provided for automatically increasing the closing force on the valve mechanism as it closes. One end of a flexible line is attached to the valve mechanism and extends over the projection. The other end of the line is attached to the container for holding the container, whereby a predetermined amount of material by weight is automatically dispensed into the container, upon which event the valve mechanism automatically closes to insure that no more than the desired weight of material is dispensed.

An object of the present invention is to provide an improved mechanism for dispensing material by weight.

Another object of the invention is to provide a weight actuated dispensing mechanism which is extremely dependable and easy to use and economical to construct.

A further object of the invention is to provide a weight operated dispensing mechanism which can be easily used with metric or British weight systems without danger of confusion of the two systems.

Other objects, advantages and novel features of the present invention will become apparent from the following detailed description of the invention when considered in conjunction with the accompanying drawings.

BRIEF DESCRIPTION OF THE DRAWINGS

FIG. 4 is a partial cross-sectional view taken along line 4—4 of FIG. 2;

DESCRIPTION OF THE PREFERRED EMBODIMENT

Figure 1:
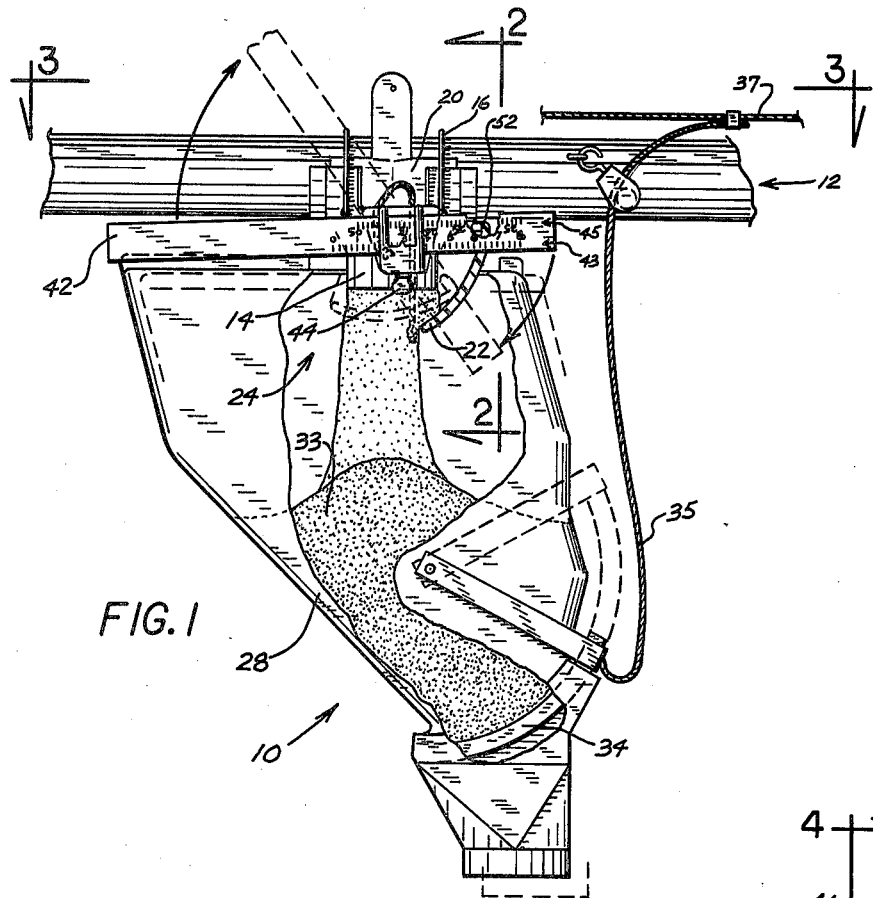
FIG. 1 is a side elevational view of the preferred embodiment of the present invention with a portion broken away.

Referring now to the drawings wherein like reference numerals designate identical corresponding parts throughout the several views, FIG. 1 shows a weight actuated accumulating device 10 constructed according to this invention. The preferred embodiment of the weight actuated accumulating device is used in conjunction with a conveyor system including a tube 12, for example as disclosed in U.S. Pat. Nos. 2,738,765 and 3,905,473 herein incorporated by reference.

The device includes a tube bracket 14 which is fastened with clamps 16 to the conveyor tube 12 so that a hole 18 (FIG. 4) in the tube bracket 14 is directly beneath the hole in conveyor system 12. Interposed between the tube bracket and the conveyor system is a valve member 20, which when rotated open, exposes the weight actuated valve gate 22 to the material delivered by the conveyor system. This valve 20 is more fully disclosed in U.S. Pat. No. 4,031,857 to Jones, which patent is incorporated herein by reference.

The heart of the weight accumulating device is a weight actuated valve 24 (FIG. 2), which is attached to the tube bracket 14 by inserting bosses 26 (FIGS. 3, 5) into corresponding holes in the tube bracket 14. The weight actuated valve 24 includes a housing 28 (FIG. 1) situated on one side of a fulcrum 30 (FIG. 4), with portions of the weight actuated valve 24 situated on the other side.

When valve member 20 and the weight actuated valve 24 are open and the valve member 34 (FIG. 1) is closed, material delivered by the conveyor system falls through a hole 32 (FIG. 3) in the top of housing 28 and accumulates therein. The weight actuated valve 24 closes automatically, as discussed hereinafter, when the weight of the accumulated material in housing 28 equals the weight valve preset on the valve 24. Once closed, the weight actuated valve 24 remains closed and the accumulated material remains in the housing 28 until valve gate 34 (FIG. 1) is opened. With the conveyor system stopped, if valve gate 34 is opened, the accumulated material, represented by the dashed lines in FIG.

1, flows out downwardly from the housing 28. This action reduces the weight on the housing side of the fulcrum causing the weight actuated valve 24 to open. Upon closing valve gate 34 and restarting the conveyor system, the weight accumulating device is ready once again to repeat the process described.

Valve member 20, housing 28, and valve gate 34 are clearly disclosed in U.S. Pat. No. 4,031,857 mentioned above.

Figure 3:
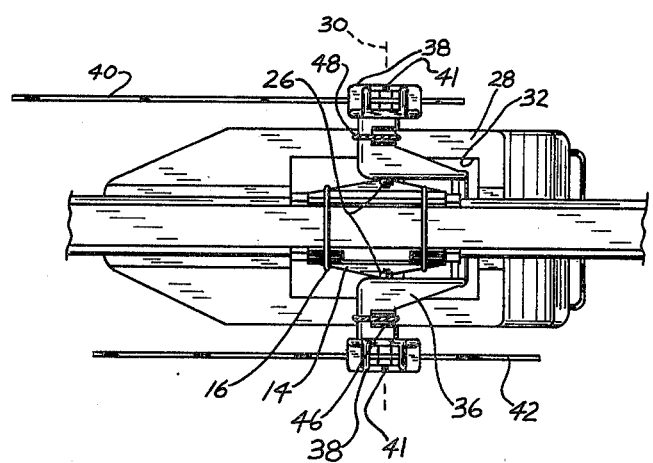
FIG. 3 is a top view taken along line 3—3 of FIG. 1.
Figure 7:
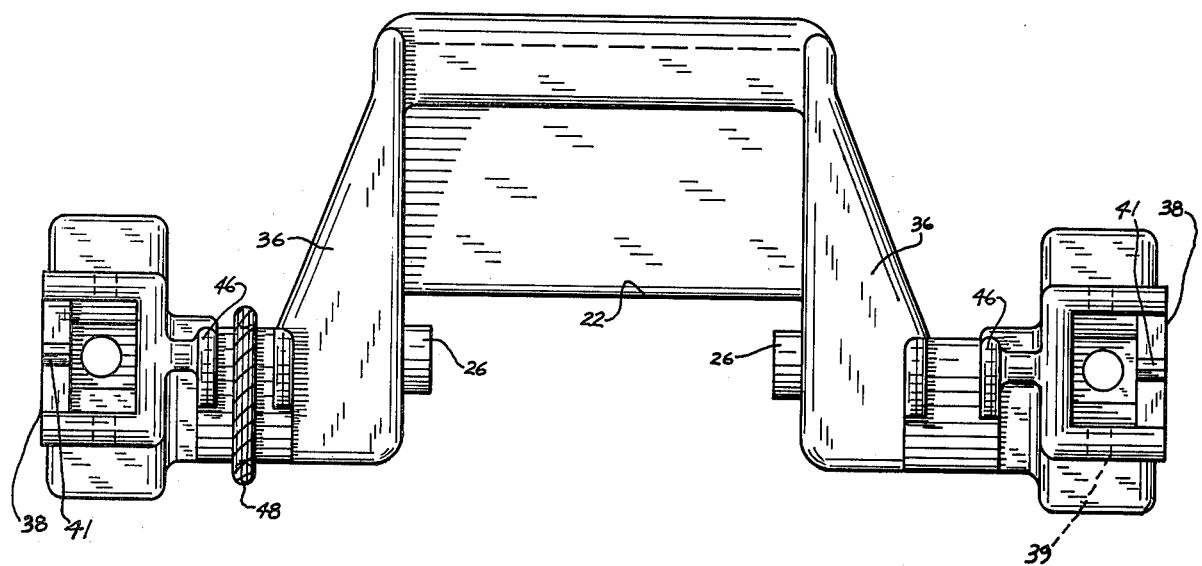
FIG. 7 is a top view of the valve member taken along line 7—7 of FIG. 5.
Figure 5:
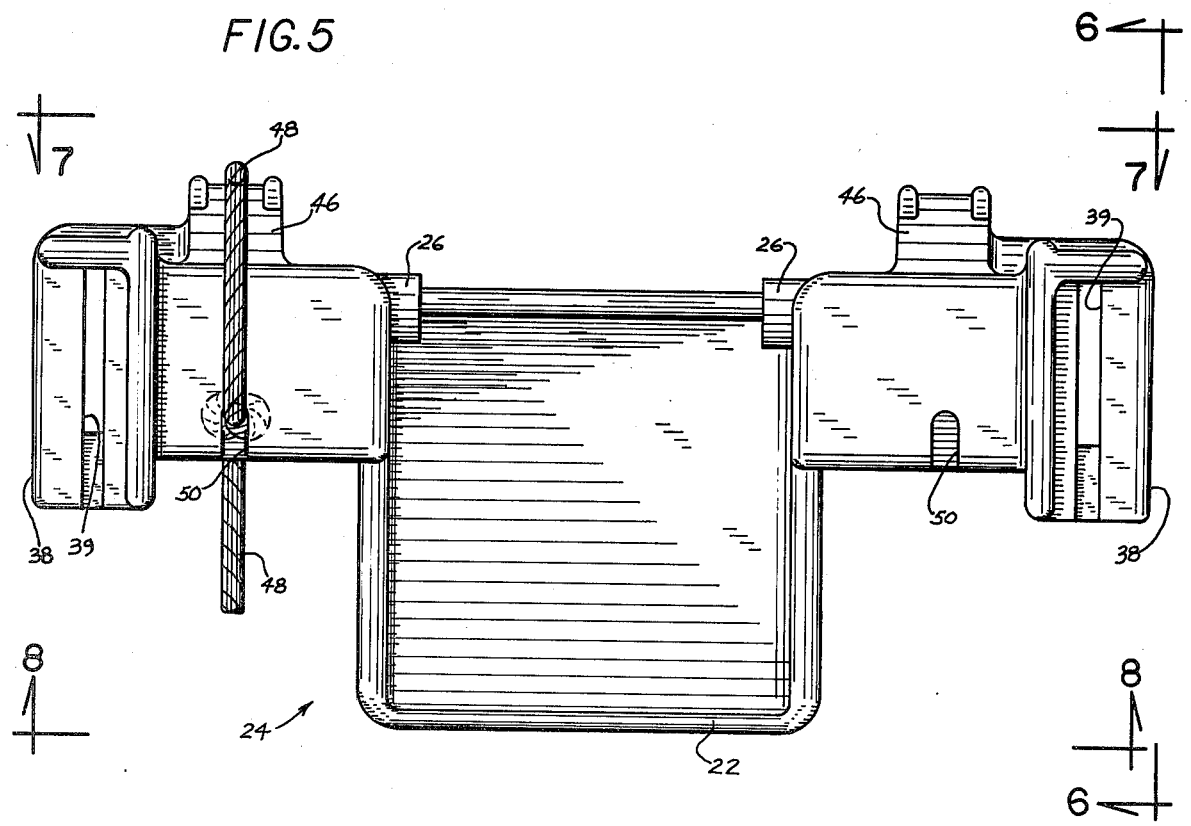
FIG. 5 is a side view of the valve member of the present invention.

A key element in the weight actuated valve 24 is the pivot member 36 (FIGS. 3, 5). It has three functions.

First, ends 38 (FIG. 3) have slots 39 (FIG. 5) located transversely to fulcrum 30 so as to allow the gross calibration bar 40 (FIG. 3) and the fine calibration bar 42 (FIGS. 1 and 3) to slide in a direction parallel to the conveyor tube 12 when the weight actuated valve 24 is open. Bars 40 and 42 are held in a fixed position relative to pivot member 36 by set screws 44 (FIGS. 1 and 2).

Figure 2:
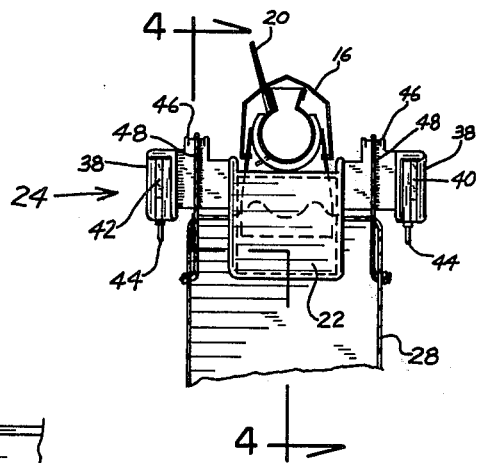
FIG. 2 is a partial cross-sectional view taken along line 2—2 of FIG. 1.

Second, as shown in FIG. 4, the axle portion 46 (FIG. 2) is shaped so ropes 48 may be fastened to notches 50 (FIG. 5) on one side of the axle, and wrapped over the top and fastened to housing 28 on the other side by extending the ends 49 through openings in the wall of housing 28 and then tying a knot in ends 49 as shown in FIGS. 1, 2 and 4. The axle portion 46 is further shaped so the weight of housing 28 acts through a short moment arm, distance X (FIG. 4) when valve 24 is open and through a long moment arm, distance Y (FIG. 4), when the valve 24 is closed. Since the distance Y is significantly greater than distance X, valve gate 22 operates to close rapidly when the weight of the accumulated material equals the preset weight. Preferably the distance Y is at least three times greater than the distance X.

Figure 6:
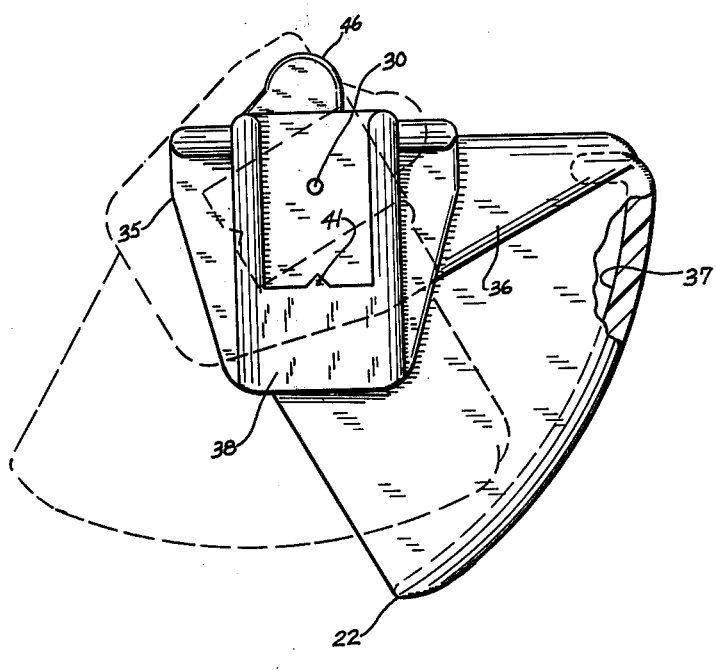
FIG. 6 is a side elevational view taken along line 6—6 of FIG. 5.
Figure 8:
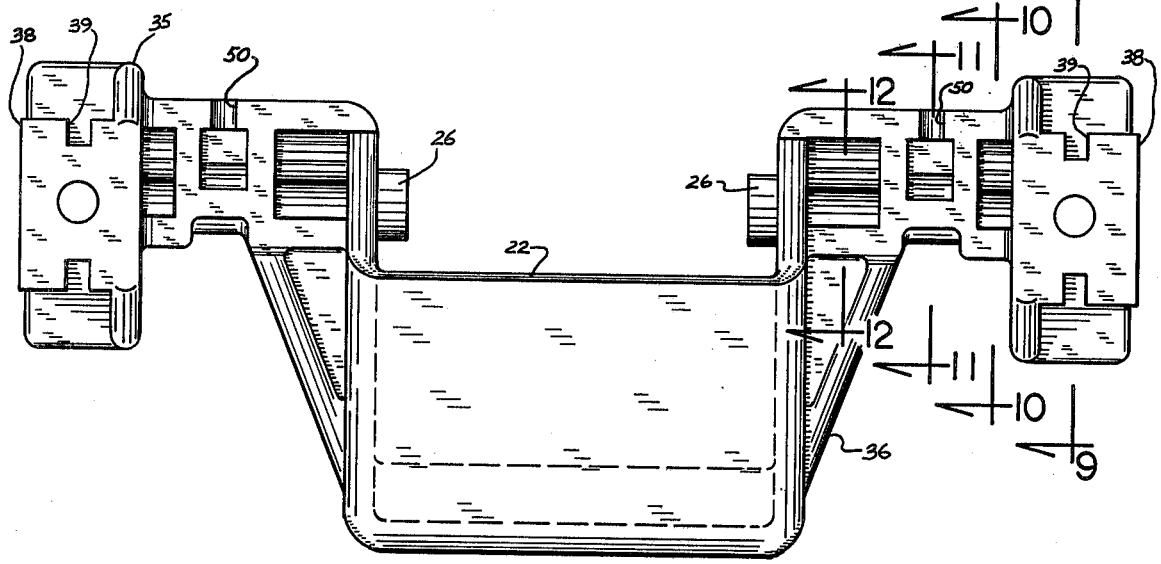
FIG. 8 is a bottom view of the valve member taken along line 8—8 of FIG. 5.
Figure 9:
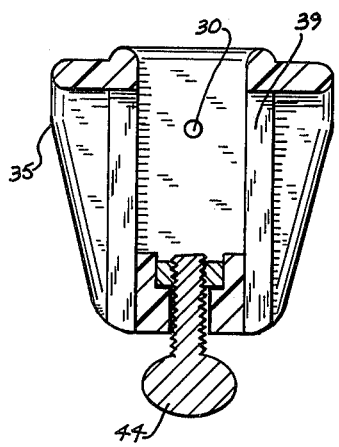
FIG. 9 is a cross-sectional view taken along line 9—9 of FIG. 8.
Figure 10:
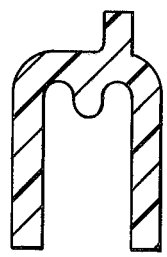
FIG. 10 is a cross-sectional view which shows the identical cross-sectional configuration along both lines 10—10 and 12—12 of FIG. 8.
Figure 11:
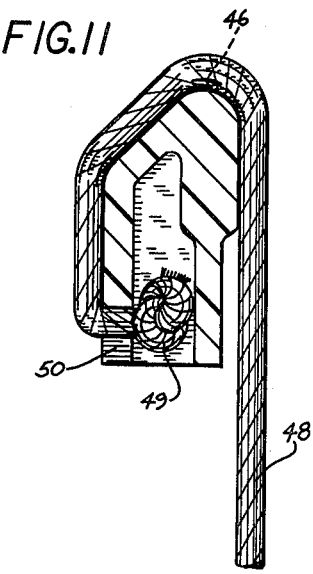
FIG. 11 is a cross-sectional view taken along line 11—11 of FIG. 8.

Third, valve gate 22 (FIG. 5) is the central portion of pivot member 36. As shown in FIG. 6, it is shaped to enhance a rapid open/close feature of the valve 24 by substantially offsetting a distance S, the radius, R, of the gate from fulcrum 30. Due to this offset, gate 22 expands open; that is, gate 22 moves away from and uncovers hole 18 more rapidly than it would if it merely slid along an imaginary circle of which the gate were but a part. In other words it is an important feature of the invention that the radius R of the gate 22 from axis point 35 to 37 is substantially greater than the pivotal axis & from the point 30 to the point 37.

Another aspect of valve gate 22 is the short right angle step 52 (FIGS. 1, 4) at one end of the gate. Step 52 contacts the cylindrical portion 53 of tube bracket 14 to hold gate 22 in the proper position when the weight actuated valve 24 is closed as shown in solid lines in FIG. 4. When valve 24 is open (as shown in dashed lines in FIG. 4), stop 52 contacts the cylindrical portion of the conveyor system 12 so as to again hold gate 22 in the proper position.

To calibrate the scale, including bars 40 and 42, the bar 42 is set at zero (0). That is done by loosening the set screw 44, sliding the bar 42 in groove 39 until the pointer 41 (FIG. 6) is pointing at zero on the scale affixed to bar 42. Then the set screw 44 is tightened down against the bar 42 to hold it firmly in place. Once this has been accomplished, the set screw 44 on the other side of valve 24 is loosened, the tare weight bar 40 is slid one way or the other until the balance point is found, that is, the point at which the valve 24 just begins to open or just begins to close (depending upon whether bar 40 is too much one way or the other way when this calibration procedure begins) at which time the set screw 44 for bar 40 is tightened down to securely hold the bar 40 in place with respect to slot 39 in valve 24.

The device, once calibrated to zero, is then ready for operation. The scale 43 on bar 42 has one scale on the lower portion of the outside which is in pounds, for example, and another scale which appears up-side-down in FIG. 1, which is a metric weight scale for example. The scale in actual use is the one which is right side up and the one which is upside down will be ignored. If it is desired to switch from one scale to the other, the set screw 44 is loosened, the bar 42 is slid out of slot 39, turned over and reinserted in slot 39 such that the scale desired to be used appears right side up and the scale not to be used appears upside down. Once properly positioned the bar 42 would be secured in place by again tightening the appropriate set screw 44.

Initially the bar 42 is then set at a desired weight, for example at two pounds, again by using a set screw 44 and sliding it in slot 39 as described above. Once so set and secured in place with the housing container 28 empty, the valve 24 will be in the open position as shown in solid lines in FIG. 1, and the gate 34 of container 34 will be in the closed position as shown in solid lines in FIG. 1.

The conveyor system will then be operated to cause a granular or powdery material to flow through the tube 12 and drop into the container 28 as is well known. Once an amount of material equalling the setting on bar 42, in this example two pounds, falls into container 28, then the valve 24 will close to the position shown in dashed lines in FIG. 1 and solid lines in FIG. 4. As noted above, as the valve 24 begins to close, the lever arm is a distance X and once it begins to turn, the effective lever arm quickly lengthens and becomes the distance Y, which causes an increasing force to be applied to insure positive closing of the valve gate 22.

A most common usage of this invention is in a poultry or livestock building in which many of these devices are used to feed individual pens of birds or animals. Consequently all of such containers 28 can be filled to whatever setting is set on each individual ones of these devices. Then when it is desired to feed these measured portions 33 to the poultry or livestock, the cable 35 is pulled (manually or automatically) to allow the feed or other material 33 to drop out of the container 28 to a pan or the like (not shown). When this occurs, the weight transmitted through ropes 48 is insufficient to hold the valve 24 closed and the weight of bar 42 causes the valve 24 to automatically open. The device is then reset to operate automatically again as described above.

A cable 37 can be utilized to open a large number of gates 34 on an equal number of devices 10 if desired, and each will automatically be reset when the material 33 drops out of the containers 28. An individual unit 10 installed in such a system can be utilized merely by opening valve 20. The valve 20 can be manually closed and an individual unit 10 not used, for example if there was not a bird or animal to feed in the particular pen wherein such individual unit 10 is installed.

The weight accumulating device 10, while particularly adapted for use with a feed conveyor system 12, would equally be adapted for handling any kind of powder or granular material. Obviously, many modifications and variations of a weight accumulating device are possible in light of the above teachings. It is therefore to be understood that, within the scope of the claims, the invention may be practiced otherwise than as specifically described herein.

I claim:

1. A weight actuated dispensing mechanism comprising:
   a bracket means adapted to be attached to a conveyor system and having an inlet opening therein for receiving material from the conveyor system and an outlet opening for allowing said material to exit said bracket means by gravity;
   a valve means pivotally attached along an axis to said bracket means for movement between a first position wherein said valve means closes said outlet opening of said bracket means and a second position wherein said valve means allows said outlet opening to be open;
   a container means disposed below said bracket means for receiving material exiting said outlet opening;
   a projection means on said valve means for automatically increasing the closing force on said valve as it closes; and
   flexible line means attached to said valve means and extending over said projection means and being further attached to said container means and comprising a means for holding said container under said outlet opening.

2. The mechanism of claim 1 including a second valve means for selectively opening the bottom of said container means for allowing material in said container means to drop out.

3. The mechanism of claim 1 wherein said valve means includes an arcuately shaped gate member having a radius which is greater than the distance of said gate member to said pivoted axis of the valve means whereby said gate member expands away from the outlet port of said bracket means for insuring positive opening of said valve means when the material is emptied from said container means.

4. The mechanism of claim 1 wherein the effective moment arm of the weight of the container means tending to close the valve means increases in length due to the configuration of said projection means as said valve means closes due to the weight of the material accumulating in said container means.

5. The mechanism of claim 4 wherein said moment arm decreases as said valve means opens due to the emptying of material from said container means.

6. The mechanism of claim 4 wherein said projection means includes a pair of projection members attached to said valve means and a pair of flexible line means operatively connected to said projection means and to said container means.

7. The mechanism of claim 1 including weight means adjustably attached to said valve means for counterbalancing and setting the weight at which said valve closes.

8. The mechanism of claim 7 wherein said weight means includes a bar means operably connected to said valve means.

9. The mechanism of claim 8 including means for selectively adjusting the position of said bar means with respect to said valve means.

10. The mechanism of claim 8 wherein said bar means includes a first weight scale means for indicating the amount of material gathered before said valve means closes and a second weight scale means, said second weight scale means being upside down when said first scale means is being used and including means for permitting said bar to be turned over whereby said second scale means can be used and the first scale means appears upside down.

11. The mechanism of claim 10 wherein said weight means includes a second bar means for facilitating the calibrating of said weight means.

* * * * *